United States Patent
Bader et al.

(10) Patent No.: US 7,976,431 B2
(45) Date of Patent: Jul. 12, 2011

(54) METHOD FOR SHIFTING ACTUATION OF AN AUTOMATED GROUP TRANSMISSION

(75) Inventors: Josef Bader, Friedrichshafen (DE); Andreas Graf, Stockach-Wahlwies (DE); Martin Miller, Immenstaad (DE); Mario Steinborn, Friedrichshafen (DE); Thomas Hafen, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 556 days.

(21) Appl. No.: 12/207,013

(22) Filed: Sep. 9, 2008

(65) Prior Publication Data
US 2009/0071277 A1 Mar. 19, 2009

(30) Foreign Application Priority Data

Sep. 15, 2007 (DE) .......................... 10 2007 043 695

(51) Int. Cl.
*B60W 10/04* (2006.01)
*F16H 59/30* (2006.01)
*F16H 37/02* (2006.01)
*F16H 59/00* (2006.01)

(52) U.S. Cl. ........ 477/109; 477/124; 477/184; 475/209; 74/335

(58) Field of Classification Search .................. 477/107, 477/109, 124, 184; 475/900, 208, 209; 74/329, 74/330, 331, 335, 336 R, 339
See application file for complete search history.

(56) References Cited

U.S. PATENT DOCUMENTS

| | | | | |
|---|---|---|---|---|
| 5,706,197 A * | 1/1998 | Stasik et al. | ............... | 701/52 |
| 7,021,170 B2 | 4/2006 | Döbele | | |
| 7,077,024 B2 * | 7/2006 | Lauri et al. | ................ | 74/325 |
| 2006/0116238 A1 * | 6/2006 | Karlsson et al. | ............ | 477/109 |
| 2007/0288150 A1 | 12/2007 | Schnitzer | | |
| 2008/0113847 A1 * | 5/2008 | Groner et al. | ................ | 477/34 |
| 2009/0071274 A1 * | 3/2009 | Bader et al. | ................ | 74/335 |
| 2009/0239704 A1 * | 9/2009 | Steinborn et al. | ............ | 477/4 |

FOREIGN PATENT DOCUMENTS

| | | |
|---|---|---|
| DE | 101 52 857 A1 | 5/2003 |
| DE | 10 2004 055 857 A1 | 6/2006 |
| EP | 0 769 641 A1 | 4/1997 |
| WO | WO-99/00612 | 1/1999 |

OTHER PUBLICATIONS

"Die ZF-AS-Tronic-Familie", Automatische Getriebe für alle Nutzfahrzeugklassen, *Zeitschrift ATZ* Sep. 2004, pp. 772-783.

* cited by examiner

*Primary Examiner* — Roger Pang
(74) *Attorney, Agent, or Firm* — Davis & Bujold, P.L.L.C.

(57) ABSTRACT

A method for shifting an automated transmission situated in a drive train of a motor vehicle between an engine and a drive axle and having at least one multi-speed main transmission and a two-speed range change group rear-mounted thereon. The main transmission has at least one counter shaft with a transmission brake. A clutch engages the prime mover and the main transmission and the range change group is shifted via unsynchronized dog clutches which are combined in pairs in a common shift set and have two shift positions and one neutral position such that, during a range change gear shift both in the main transmission and the range change group a change between two ratio stages occurs. A range change up-shift includes synchronizing the input shaft and the target gear utilizing the transmission brake and passively synchronizing the dog shifted transmission parts by the edge beveling of the concerned dog clutches.

6 Claims, 3 Drawing Sheets

METHOD FOR SHIFTING ACTUATION OF AN AUTOMATED GROUP TRANSMISSION

This application claims priority from German Application Serial No. 10 2007 043 695.7 filed Sep. 15, 2007.

FIELD OF THE INVENTION

The invention concerns a method for shifting actuation of an automated group transmission situated in a drive train of a motor vehicle, between a prime mover and an axle drive, and comprising at least one multi-speed main transmission and one two-speed range, change group rear-mounted thereon and in which the main transmission is constructed in countershaft design with at least one countershaft provided with an actuatable transmission brake. The input shaft is connected, via an actuatable separating clutch, with the prime mover and the main transmission, the same as the range change group, are actuatable, via unsynchronized dog clutches, combined in pairs in a common shift set having two shifting positions and one neutral position wherein, during a range change gear shift, both in the main transmission and in the range change group, one change occurs, respectively, between two ratio stages.

BACKGROUND OF THE INVENTION

Group transmissions, having one multi-speed main transmission and one splitter group front-mounted thereon by drive technology, the same as a range change group rear-mounted on the main transmission by drive technology, have been known for a long time and are preferably used in industrial vehicles. The ratio jumps of the main transmission are halved by one splitter group designed generally with two speeds, having in about half of a middle ratio jump, between two consecutive ratio stages of the main transmission, a corresponding ratio jump and the number of gears of the group transmission altogether available is doubled. By a range change group, usually of two speeds with one ratio spanning over the whole ratio jump of the main transmission by about one middle ratio jump, between two consecutive ratio stages of the main transmission, the spread of the whole transmission is approximately doubled and the number of the total gears of the group transmission altogether available is again doubled. Relative to a three-speed main transmission (with three forward speeds and one reverse speed), this results in one 12-gear group transmission with altogether twelve forward gears and a maximum of four reverse gears and in relation to a four-speed main transmission, having four forward gear stages and one reverse gear stage, a 16-gear group transmission results and has a total of sixteen forward gears and a maximum of four reverse gears. Such a group transmission has, in comparison with a single transmission with a similar number of gears and similar gear gradation and spread, clearly more compact dimensions and lighter weight. But since many gear shifts in a group transmission require the change of ratio stages in several parts of the transmission and thus the sequence is relatively complicated, most known group transmissions are constructed such that they are either partly automated or fully automatedly shiftable.

A general view of the Applicant's automated group transmissions has been published in a periodical ATZ September 2004, pages 772-783. To the series of products of automated shift transmission, designated as AS-Tronic Family, belong the transmissions of the AS-Tronic middle line of products built for medium heavy industrial vehicles and the transmissions of the AS-Tronic line of products provided for heavy industrial vehicles, each designed as group transmission with one multi-speed, that is, main transmissions provided with three or four forward stages, one two-speed, splitter group front-mounted on the main transmission and one two-speed, range change group rear-mounted on the main transmission. The main transmission is constructed in countershaft design provided with unsynchronized dog clutches having, in the case of the AS-Tronic line of products, two countershafts for reasons of weight and space optimization. In both lines of products, the main transmission is optionally available in a direct gear design ($i_{HG\_min}=1$) or in a fast gear design ($i_{HG\_min}<1$). The splitter group is designed as a countershaft transmission with two shiftable, input constants for the main transmission. The range change group is designed as a two-speed, planetary transmission with one shiftable direct connection ($i_{GP}=1$) and one alternatively shiftable high ratio ($i_{GP}\gg1$).

A group transmission, having one multi-speed, main transmission in countershaft design, one splitter group front-mounted thereon with two shiftable input constants of the main transmission and one range change group in planetary design rear-mounted on the main transmission is, moreover, known from WO 1999/00612 A1. This known group transmission can be optionally designed as a direct transmission by equipment with a different gear wheel pair forming an input constant of the main transmission or as a fast gear transmission. One alternative to this, of a group transmission with one two-speed, main transmission in countershaft design (with two forward gear stages and one reverse gear stage), one three-speed, splitter group front-mounted thereon and one range change group in planetary design rear-mounted on the main transmission, has been described in EP 0 769 641 B1.

In the group transmissions of the AS-Tronic line of products and of the AS-Tronic middle line of products have been built with synchronized shift clutches of the splitter group and of the range change group, combined in a common shift set, whereas the main transmission was designed to be shifted with a dog clutch, that is, shiftable by way of unsynchronized dog clutches. But since the concerned synchronized shift clutches, due to a complicated construction, are relatively more expensive, need a relatively large amount of space and, as a result of wear, the duration of the whole group transmission is limited for future designs of such group transmissions. It could be provided that, together with the main transmission, the range change group is also a dog shifted designed.

Due to the unsynchronized design of the range change group in such a group transmission, a special shifting sequence is required which, to a great extent, is clearly identical to that of a group transmission, but differs from group transmissions, provided with a synchronized range change group. A suitable method for shifting actuation of a group transmission, having an unsynchronized range change group, has been proposed, for example, in DE 101 52 857 A1. In the method, it is essentially provided that, during a range change gear shift, the front-mounted group and the range change group first are shifted to their neutral position to interrupt the energy flow, the main transmission is decelerated by way of a transmission brake, and subsequently the rotational speed of the prime mover begins to be adjusted to the synchronous rotational speed of the target gear. After shifting of the main transmission, the front-mounted group is synchronizedly shifted to its target ratio stage. When the prime mover reaches the synchronous rotational speed, the target ratio stage of the range change group is activated.

It is, of course, disadvantageous in this known method that the existence of a front-mounted group or of a splitter group front-mounted on the main transmission is presupposed and that the shifting sequence can only be used in a range change upshift, similarly the reaching of the synchronous rotational speed by the prime mover to be expected prior to the activation of the target ratio stage of the range change group is delayed.

With this background, the basic function of this invention is to obtain an improved method for shifting actuation of an automated group transmission of the kind mentioned above which, compared to the known method, makes a faster shifting sequence possible and can also be used in group transmissions having no front-mounted group or no splitter group front-mounted on the main transmission.

SUMMARY OF THE INVENTION

The invention departs from a method for shifting actuation of an automated group transmission situated in a drive train of a motor vehicle, between a prime mover and an axle drive and having at least one multi-speed main transmission, the same as a two-speed range change group rear-mounted thereon, and in which the main transmission is constructed in countershaft design with at least one countershaft provided with one actuatable transmission brake, the input shaft is connected with the prime mover, via an actuatable separating clutch and the main transmission, the same as the range change group, are each shiftable by unsynchronized dog clutches, combined in a common shift set having two shifting positions and one neutral position wherein, during a range change gear shift, a change occurs both in the main transmission and in the range change group.

The method of the stated function consists in that a range change upshift is carried out with the following steps:

SH1) load reduction of the prime mover,
SH2a) de-activation of the actual ratio stage L of the range change group (GP=N) and
SH2b) full disengagement of the separating clutch (K=0),
SH3) beginning of control of the prime mover to the target rotational speed of the input shaft ($W_{GE}$),
SH4) synchronizing of the input shaft ($W_{GE}$) to the target rotational speed by actuation of the transmission brake (Br>0),
SH5) de-activation of the actual ratio stage of the main transmission (HG=N),
SH6a) activation of the target ratio stage of the main transmission (HG) and
SH6b) activation of the target ratio stage of the range change group (GP),
SH7a) full engagement of the separating clutch (K=1), and
SH7b) load reduction of the prime mover.

The inventive method is based on an automated group transmission situated in a drive chain of a motor vehicle, between a prime mover and a drive axle, and which comprises at least one multi-speed main transmission HG, HG' and one two-speed range change group GP rear-mounted thereon. The main transmission HG, HG', as usual in the group transmissions known, is constructed in countershaft design and has, together with an input shaft $W_{GE}$ connected with the prime mover by an actuatable separating clutch K and one main shaft $W_H$, at least one countershaft $W_{VG1}$, $W_{VG}$ coupled with an actuatable transmission brake Br. The main transmission HG, HG' and the range change group GP are shiftable by unsynchronized dog clutches combined in pairs in a common shift set S1, S2, SP or S1', S2', S3', SP having two shifting positions and one neutral position N.

In such a group transmission, a range change group gear shift is known to contain both in the main transmission HG, HG' and in the range change group GP, a change between two ratio stages. During a range change upshift, the main transmission HG, HG' is shifted from the highest ratio stage G3, G4' to the lowest ratio stage G1, G1' and the range change group GP is upshifted from the slow drive L to the fast drive S.

In order for this to occur as quickly as possible with acceptable shifting comfort, it is provided that after an extensive reduction in the load of the prime mover (method step SH1), the actual ratio stage (slow drive L) of the range change group GP is first de-activated (method step SH2a), that is, the range change group GP is shifted to its neutral position N (GP=N), and at about the same time the separating clutch K is fully disengaged (method step SH2b, K=0). Thereafter begins the actuation of the prime mover to the target rotational speed of the input shaft $W_{GE}$ for the total ratio of the target gear (method step SH3). Together with this, by adequate actuation of the transmission brake (Br>0), begins synchronization of the input shaft $W_{GE}$, which is drivingly connected with the countershaft ($W_{VG1}$ or $W_{VG}$) via the input constant (K1, K2 or K0), to the target rotational speed in the target gear at the end of the gear shift (method step SH4). The actual ratio stage (G3, G4') of the main transmission HG, HG' is then de-activated (method step SH5), that is, the main transmission HG, HG' is shifted to neutral (HG=N or HG'=N). When reaching the target rotational speed, the transmission brake Br is released by the input shaft $W_{GE}$ and then essentially simultaneously the target ratio stage (G1, G1') of the main transmission HG, HG' and the target ratio stage S of the range change group GP, staggered or consecutively, are activated unsynchronized (method steps SH6a and SH6b), the rotational speed being adjusted via edge beveling of the dog clutches. At the same time, the main shaft $W_H$ that binds both transmission parts HG, HG', GP is adequately delayed by the simultaneous activation of the concerned shift clutches S2, S2' SP. Finally, the separating clutch K is fully engaged (method steps SH7a, K=1) and the load buildup of the prime mover takes place (method steps (SH7b).

The inventive method can be used in the manner described above, both in group transmissions without a front-mounted group or without a front-mounted splitter group GV and in a group transmission with a front-mounted group or with a front-mounted splitter group GV where the splitter group is not reversed during range change upshift.

As is usual with a multi-speed main transmission HG, HG', if the lowest ratio stage G1, G1' and the highest ratio stage G3, G4' are coordinated with different shift sets S1, S2; S1', S2' or shift gates, in the range change upshift within the main transmission HG, HG', an additional gate change is required, that is, a changeover of the main transmission HG, HG' to the shift gate of the target ratio stage. The changeover of the shift gate of the main transmission HG preferably occurs immediately after de-activation of the actual ratio stage G3, G4' of the main transmission HG, HG', that is, after the method step SH5 and before activation of the target ratio stage G1, G1'; S of the main transmission HG, HG' and the range change group GP, that is, prior to the method steps SH6a and SH6b.

When the group transmission is provided with a synchronized, shiftable, two-speed group front-mounted on the main transmission HG or splitter group GV, and the splitter group GV must likewise be changed over during the range change upshift, then the changeover of the splitter group GV conveniently occurs after de-activation of the actual ratio stage L of the range change group GP in the method step SH2a and thus at the same time as the beginning of actuation of the prime mover to the target rotational speed of the input shaft $W_{GE}$ in the method step SH3. In a downshift within the splitter group GV from the lower geared input constant K2 to the higher geared input constant K1, this results in acceleration of the input shaft $W_{GE}$ which consecutively (in the method step SH4) is again compensated by use of the transmission brake Br.

During the load reduction of the prime mover in the first method step SH1, the separating clutch K has advantageously been already partly disengaged to above the slip limit. Hereby the separating clutch K consecutively can be more quickly opened, since then no waiting time results for the prior filling of the clutch actuator with pressure medium and for the bypass of the idle stroke of the clutch actuator device.

During activation of the target ratio stages G1, G1', S of the main transmission and/or of the range change group GP, that is, in method steps SH6a or SH6b, if the occurrence of a tooth-on-tooth position is found on the dog clutch concerned, then the shifting sequence is conveniently continued while maintaining the concerned engagement adjusting force, since the tooth-on-tooth position is removed by a consecutive necessarily occurring relative rotation of the transmission shafts involved ($W_{VG1}$, $W_H$; $W_{VG}$, $W_H$; $W_H$, $W_{GA}$) and the dog clutch can be engaged then without delaying the shifting sequence.

The inventive method essentially relates to the fact that the dog shifted transmission part of the group transmission, that is, the main transmission HG, HG' and the range change group GP rear-mounted thereon, during a range change upshift is only roughly synchronized via the transmission brake Br and that the precise rotational speed adaptation of the transmission shafts $W_{GE}$, $W_{VG1}$, $W_{VG2}$, $W_{VG}$, $W_H$, $W_{GA}$ thus occurs passively via the edge beveling of the dog clutches of the concerned shift sets S2, S2', SP. Herefrom results in relation to the selected series of the method steps, a total shifting time as short as possible of the range change upshift with acceptable shifting comfort.

The inventive method, however, can be used not only as primarily provided during a group transmission with two dog shifted transmission parts HG, GP; HG', GP, but is also applicable in group transmissions having only one or absolutely no unsynchronized transmission part. In other words, all the method steps can also be used in group transmissions with at least one synchronized transmission part HG, GP; HG', GP. The use of the inventive method serves in this case, as emergency method and is particularly convenient in cold, in worn out synchronization, or in shifting problems occurring for other reasons.

BRIEF DESCRIPTION OF THE DRAWINGS

The invention will now be described, by way of example, with reference to the accompanying drawings in which.

DETAILED DESCRIPTION OF THE INVENTION

Figure 2:
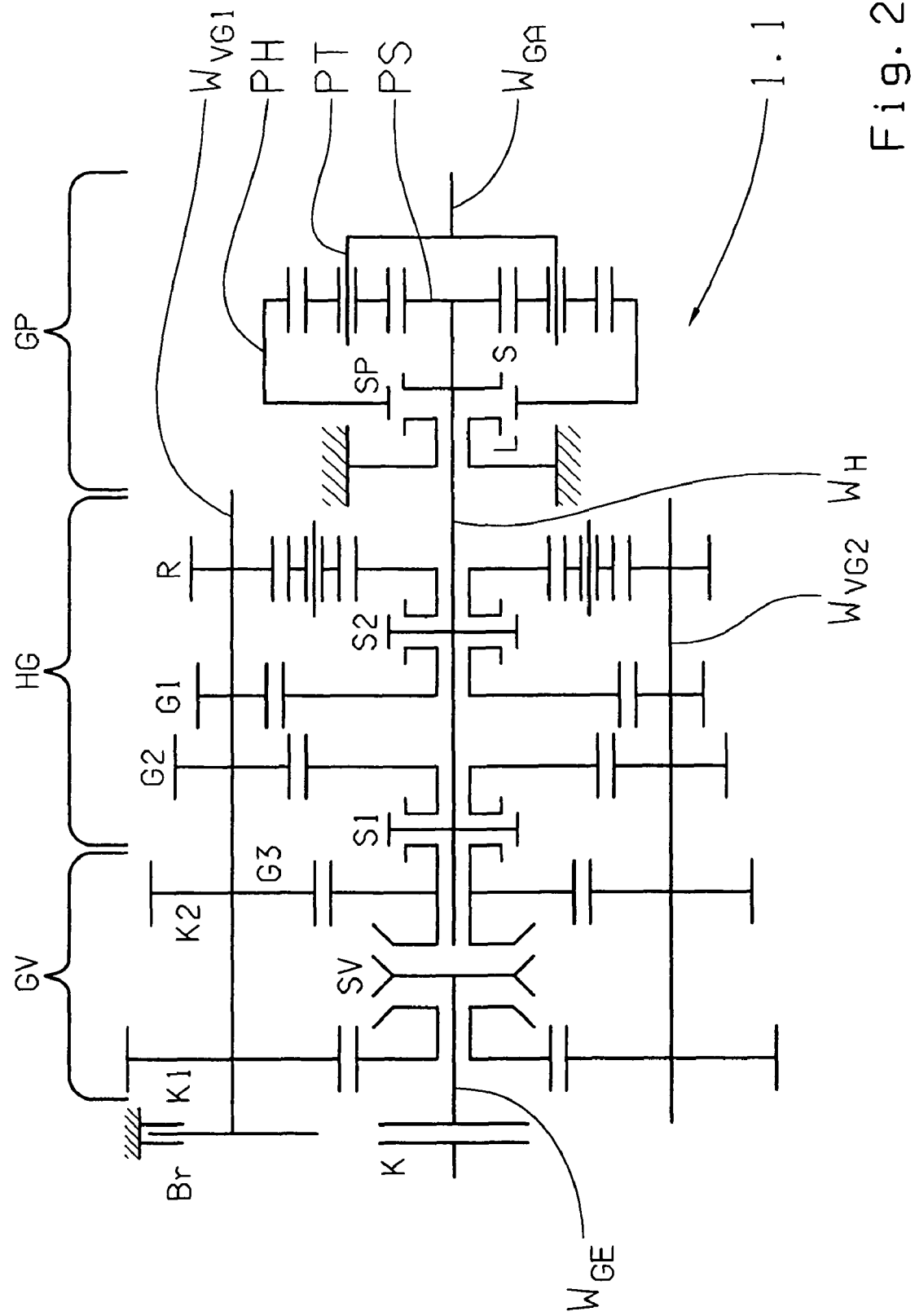
FIG. 2 is a diagrammatic structure of a first group transmission for use of the inventive method.

In FIG. 2 is shown a group transmission 1.1 where the inventive method can be used. The group transmission 1.1 comprises one main transmission HG, one group GV front-mounted thereon by drive technology and one range change group GP rear-mounted or rear placed thereon by drive technology and corresponding in its functional technical structure to an embodiment of a group transmission of the AS-Tronic line of products known per se.

The main transmission HG is constructed as a direct gear transmission having a countershaft design with one main shaft $W_H$ and two countershafts $W_{VG1}$ coupled with an actuatable transmission brake Br. The main transmission HG is built with three ratio stages G1, G2, G3 for the forward drive and one ratio stage R for the reverse drive. The idler gears of the ratio stages G1, G2, R are each rotatably supported on the main shaft $W_H$ and are shiftable by coordinated dog clutches. The coordinated fixed gears are non-rotatably situated on countershafts $W_{VG1}$, $W_{VG2}$. The highest ratio stage G3 is designed as a direct gear and is shiftable via a direct shift clutch. The shift clutches of the ratio stages G3, G2 and the shift clutches of the ratio stages G1, R, are combined in a common shift set S1, S2.

The front-mounted group GV is constructed with two speeds and likewise has a countershaft design wherein the two ratio stages K1, K2 of the front-mounted group GV form two shiftable input constants of the main transmission HG with a ratio $i_{GV}$. By a slight ratio difference of the two ratio stages K1, K2, the front-mounted group GV is designed as a splitter group. The idler gear of the first ratio stage K1 is rotatably supported on an input shaft $W_{GE}$ which, via an actuatable separating clutch K is connected with a prime mover (not shown), designed as internal combustion engine. The idler gear of the second ratio stage K2 is rotatably supported on the main shaft $W_H$. The fixed gears of both ratio stages K1, K2 are each non-rotatably situated on the input-side extended countershafts $W_{VG1}$, $W_{VG2}$ of the main transmission HG. The shift clutches, synchronizedly designed, of the front-mounted group GV are combined in a common shift set SV.

The rear-mounted change group GP is likewise designed to have two speeds, but in planetary construction with one simple planetary gearset. The sun gear PS is connected in a non-rotatable manner with the output-side extended main shaft $W_H$ of the main transmission HG. A planet carrier PT is connected in a non-rotatable manner with a shift shaft $W_{GA}$ of the group transmission GP. A ring gear PH is connected with a shift set SP having two shift clutches by which the range change group GP can alternatively be shifted by the connection of the ring gear PH with a stationary housing part to a slow drive stage L and by the connection of the ring gear PH with the main transmission $W_H$ or the sun gear PS to a fast drive stage S. Unlike the former embodiment of the AS-Tronic transmission, the shift clutches of the shift set SP are here designed unsynchronized.

Figure 1:
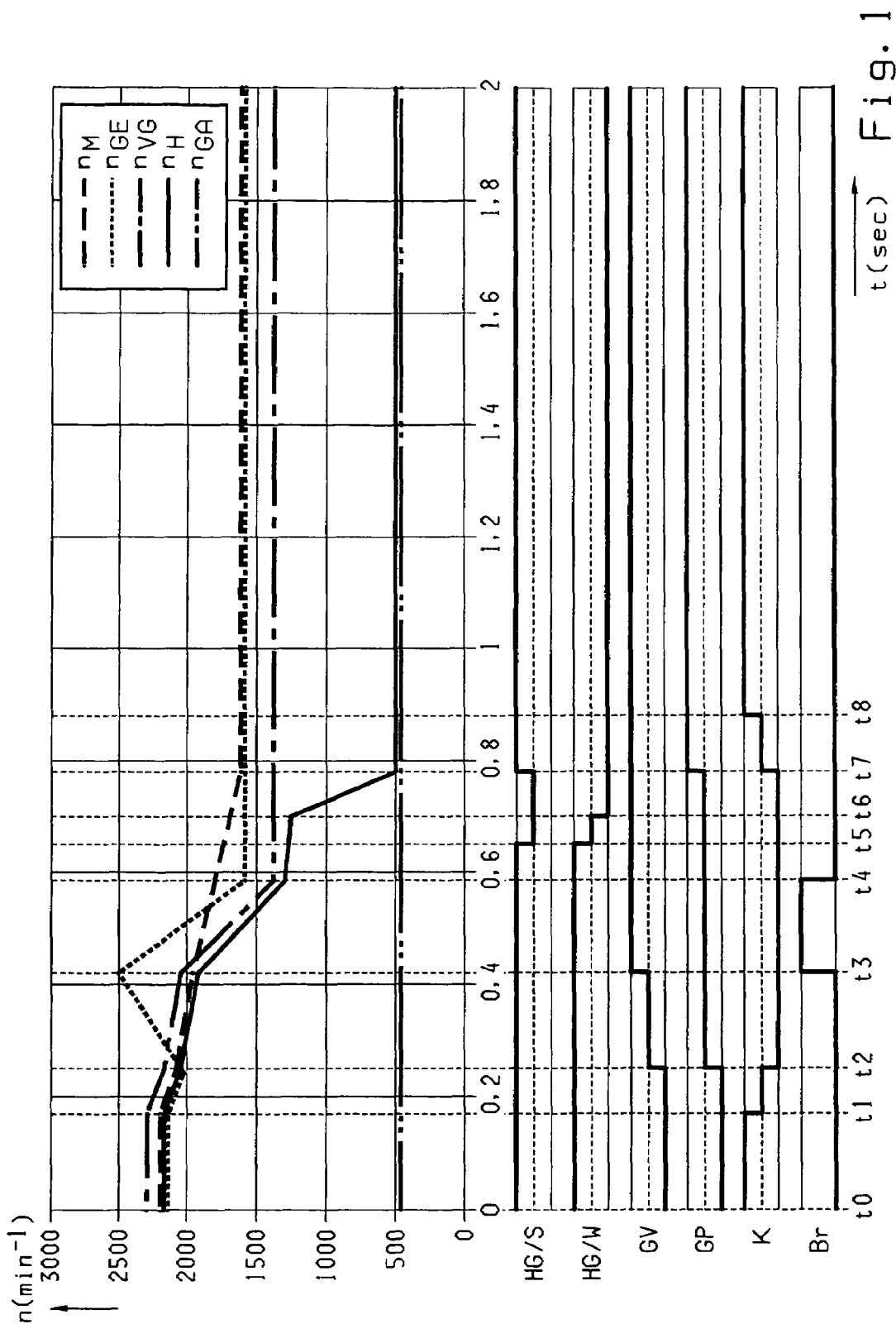
FIG. 1 is a preferred sequence of a range change upshift in the form of a simplified time diagram, according to the inventive method.

With reference to the diagram of FIG. 1, herebelow is explained an inventive method of a range change upshift carried out in the group transmission 1.1, according to FIG. 2. In the top part of FIG. 1 are reproduced the time curves of a rotational speed $n_M$ of the prime mover, a rotational speed $n_{GE}$ of the input shaft $W_{GE}$, of a rotational speed $n_{VG}$ of the first countershaft $W_{VG1}$, of a rotational speed $n_H$ of the main shaft $W_H$ and of a rotational speed $n_{GA}$ of the output shaft $W_{GA}$.

At the bottom of FIG. 1, the actuation operations of the transmission elements by a designation HG/S shifting operations are schematically shown within the main transmission HG, that is, the de-activation of the actual ratio stage G3 and the activation of the target ratio stage G1; by a designation HG/W selective operations within the main transmission HG, that is, the change of the shift gate or of the shift set from S1 to S2; by the designation GV shifting operations within the splitter group GV, that is, the changeover of ratio stages from K2 to K1; by the designation GP shifting operations within the range change group GP, that is, the de-activation of the actual ratio stage L and the activation of a target ratio stage S; by a designation K an actuation or the engagement of the separating clutch K and by the designation Br an actuation or the closing of the transmission brake Br.

At a moment t0, the reduction of the load on the prime mover begins which, at the latest, is terminated at a moment t2. Parallel to this, beginning at a moment t1, the separating clutch K pre-opens, that is, disengages to above the slip limit. At the moment t2, the actual ratio stage L of the range change group GP is first de-activated, that is, the range change group GP is shifted to the idling speed N (GP=N) and, at about the same time, the separating clutch K is fully disengaged (K=0).

Immediately thereafter begins the synchronized changeover of the splitter group GV from the actual ratio stage K2 to the target ratio stage K1 and actuation of the prime mover to the target rotational speed of the input shaft $W_{GE}$ for the total ratio of the target gear. Between a moment t3 and a moment t4, the input shaft $W_{GE}$ is synchronized, by adequate actuation of the transmission brake Br to the target rotational speed of the total ratio of the target gear.

Subsequently, at moment t5, the ratio stage G3 of the main transmission HG is de-activated and thereafter, up to a moment t6, the main transmission HG is changed over to the shift gate of the target ratio stage G1. Thereafter, at moment t7, the target ratio stage G1 of the main transmission HG and, about the same time, the target ratio stage S of the range change group GP are activated unsynchronized. Finally, the separating clutch K is again fully engaged between moments t7 and t8 before the load buildup of the prime mover occurs.

Figure 3:
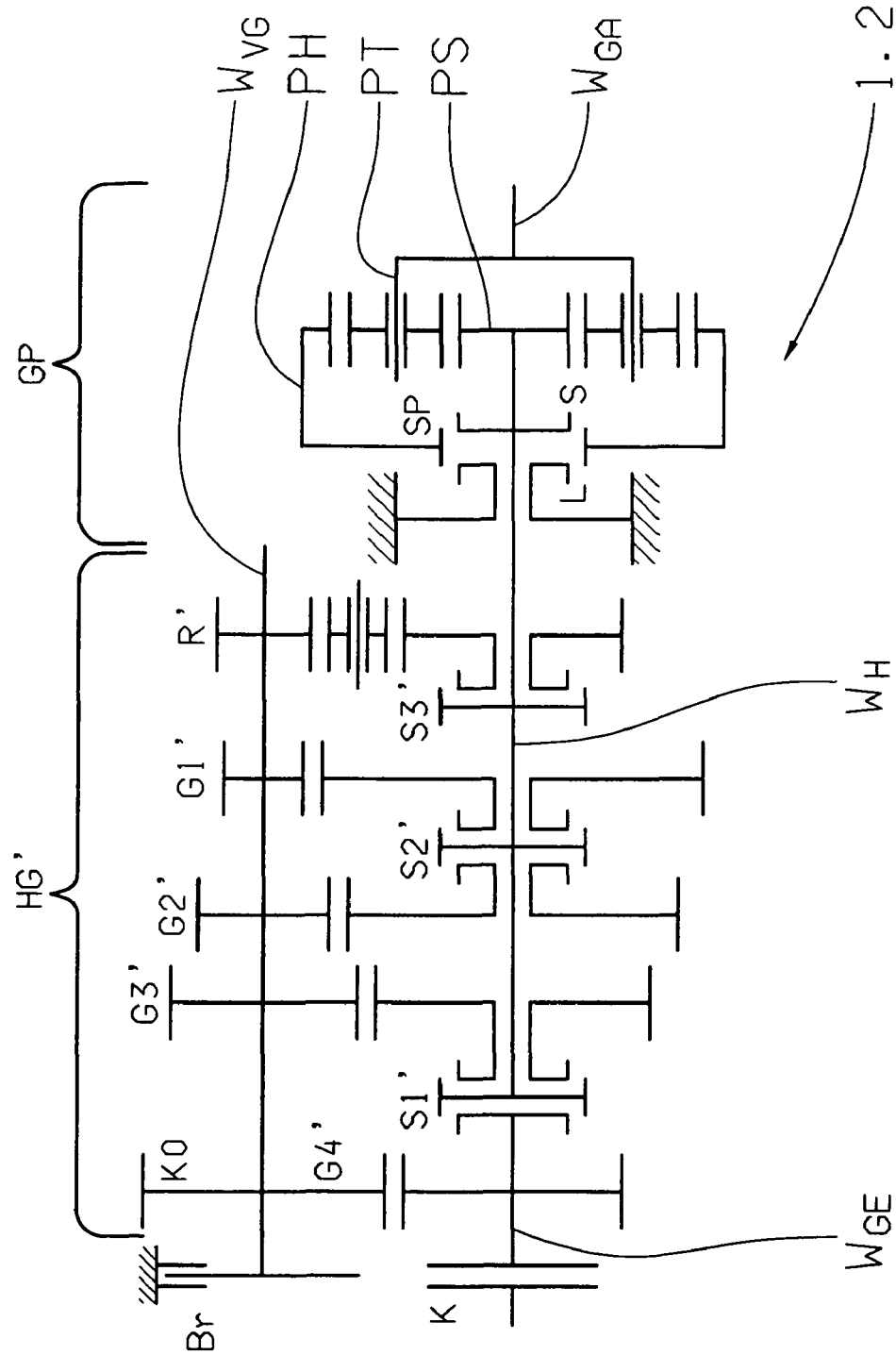
FIG. 3 is a schematic structure of a second group transmission for use of the inventive method.

One other group transmission 1.2 in which the inventive method can be used is reproduced in FIG. 3. This group transmission 1.2 comprises one main transmission HG' and one range change group GP rear-mounted thereon and its geometric structure corresponds to an embodiment of a known group transmission for light industrial vehicles.

The main transmission HG' is constructed as a direct gear transmission having a countershaft design and has one input shaft $W_{GE}$, one main shaft $W_H$ and one countershaft $W_{VG}$, the countershaft $W_{VG}$ being provided with an actuatable transmission brake Br. The input shaft $W_{GE}$ is on the input side and drivingly connected via an actuatable separating clutch K with a prime mover (not shown), and on the output side is permanently in driving connection with a countershaft $W_{VG}$ by a pair of gear wheels which form an input constant K0. The main transmission HG' is designed with four ratio stages G1'-G4' for forward drive and one ratio stage R' for reverse drive. The idler gears of the ratio stages G1', G2', G3', R' are each rotatably supported on the main shaft $W_H$ and shiftable via coordinated dog clutches. The coordinated fixed gears are non-rotatably situated on the countershaft $W_{VG}$. The highest ratio stage G4' designed as direct gear can be shifted via a direct shift clutch. The shift clutches of the ratio stages G4', G3', the same as the shift clutches of the ratio stages G2', G4', are each combined in a common shift set S1', S2'. A third shift set S3' only includes the shift clutch of the ratio stage for the reverse drive R'. The rear-mounted range change group GP corresponds, in construction and function, to the range change group GP of the group transmission 1.1 according to FIG. 2.

The sequence method for carrying out a range change upshift described above with reference to FIG. 1 is in the group transmission 1.2 identically utilized except that the method step concerning the changeover of the splitter group GV is omitted and instead of the designations for the main transmission HG and the countershaft $W_{VG1}$ thereof, as well as the concerned shift sets S1, S2 and ratio stages G1, G3, according to FIG. 2, are now used for the main transmission HG' and its countershaft $W_{VG}$, the same as the concerned shift sets S1', S2' and ratio stages G1', G4', the terms according to FIG. 3. A repetition of these already mentioned method steps can, therefore be omitted.

| Reference numerals | |
| --- | --- |
| 1.1 | group transmission |
| 1.2 | group transmission |
| Br | transmission brake |
| GP | range change group |
| GV | splitter group, front-mounted group |
| G1 | first ratio stage of HG' |
| G1' | first ratio stage of HG' |
| G2 | second ratio stage of HG |
| G2' | second ratio stage of HG' |
| G3 | third ratio stage of HG |
| G3' | third ratio stage of HG' |
| G4' | fourth ratio stage of HG' |
| HG | main transmission |
| HG' | main transmission |
| HG/S | shifting operation in HG |
| HG/W | selective operation in HG |
| $i_{GV}$ | ratio of GV |
| $i_{GP}$ | ratio of GP |
| $i_{HG}$ | ratio of HG |
| K | separating clutch |
| H0 | input constant of HG' |
| K1 | first ratio stage of GV |
| K2 | second ratio of stage of GV |
| L | slow drive stage of GP |
| n | rotational speed |
| N | neutral position |
| $n_{GA}$ | rotational speed of $W_{GA}$ |
| $n_{GE}$ | rotational speed of $W_{GE}$ |
| $n_H$ | rotational speed of $W_H$ |
| $n_M$ | rotational speed of the prime mover |
| $n_{VG}$ | rotational speed of $W_{VG1}$, $W_{VG}$ |
| PH | ring gear of GP |
| PS | sun gear of GP |
| PT | planet carrier of GP |
| R | downshift-ratio stage of HG |
| R' | downshift-ratio of stage of HG' |
| S | fast drive of GP |
| SP | shift set of GP |
| S1 | first shift set of HG |
| S1' | first shift set of HG' |
| S2 | second shift set of HG' |
| S2' | second shift set of HG |
| S3' | third shift set of HG' |
| SV | shift set of GV |
| SH1-SH7b | method steps |
| t | time |
| t0-t8 | moments |
| $W_{GA}$ | output shaft |
| $W_{GE}$ | input shaft |
| $W_H$ | main shaft |
| $W_{VG}$ | countershaft of HG' |
| $W_{VG1}$ | first countershaft of HG |
| $W_{VG2}$ | second countershaft of HG |

The invention claimed is:

1. A method for shifting an automated group transmission situated in a drive train of a motor vehicle between a prime mover and an axle drive, the automated group transmission comprising at least one multi-speed main transmission (HG, HG'), a two-speed range change group (GP) rear-mounted on the at least one multi-speed main transmission (HG, HG'), and the main transmission (HG, HG') being constructed of a countershaft design having at least one countershaft ($W_{VG1}$, $W_{VG}$) provided with an actuatable transmission brake (Br), an input shaft ($W_{GE}$) being connected via an actuatable separating clutch (K) with the prime mover, the main transmission (HG, HG') and the range change group (GP) being shiftable via unsynchronized dog clutches combined in pairs in a common shift set (S1, S2, S1'-S3', SP) having two shift positions and one neutral position (N), wherein during a range change gearshift both in the main transmission (HG, HG') and in the range change group (GP), a change between two ratio stages occurs, and a range change up-shift comprises the steps of:

reducing (SH1) a load of the prime mover;
de-activating (SH2a) an actual ratio stage (L) of the range change group (GP=N),
fully disengaging (SH2b) the separating clutch (K=0),
initiating (SH3) actuation of the prime mover to the target rotational speed of the input shaft ($W_{GE}$);
synchronizing (SH4) the input shaft ($W_{GE}$) to the target rotational speed by actuation of the transmission brake (Br>0);
de-activating (SH5) the actual ratio stage of the main transmission (HG=N);
activating (SH6a) the target ratio stage of the main transmission (HG),
activating (SH6b) the target ratio stage (6) of the range change group (GP);
fully engaging (SH7a) the separating clutch (K=1); and
increasing (SH7b) the load of the prime mover.

2. The method according to claim 1, further comprising the step of shifting the main transmission (HG, HG') to the shift gate of the target ratio stage immediately after the de-activation of the actual ratio stage (G3, G4') of the main transmission (HG, HG'; SH5) and before the activation of the target ratio stage (G1, G1'; S) of the main transmission (HG, HG') and of the range change group (GP; SH6a, SH6b), in the main transmission (HG, HG'; SH5) in which with a lowest ratio stage (G1, G1') and a highest ratio stage (G3, G4') of the main transmission (HG, HG') different shift gates are dedicated.

3. The method according to claim 1, further comprising the step of changing over a splitter group (GV) after the de-activation of the actual ratio stage (L) of the range change group (GP; SH2a), during a range change upshift which contains a synchronized, shiftable, two-speed splitter group (GV) front-mounted on the main transmission (HG).

4. The method according to claim 1, further comprising the step of partially disengaging the separating clutch (K) to above the slip limit during the load reduction of the prime mover (SH1).

5. The method according to claim 1, further comprising the step of continuing the shifting sequence while maintaining an engagement adjusting force when finding a tooth-on-tooth position of the concerned dog clutches of the shifting sequence occurring during actuation at least one of the actual ratio stage (G1, G1', S) of the main transmission (HG, HG'; SH6a) and the range change group (GP, SH6b).

6. The method according to claim 1, wherein using the method in a group transmission having at least one synchronized transmission part (HG, GP; HG', GP).

* * * * *